(12) United States Patent
Tilman

(10) Patent No.: US 8,857,271 B2
(45) Date of Patent: Oct. 14, 2014

(54) WRAPAROUND STRAIN GAGE ASSEMBLY FOR BRAKE ROD

(75) Inventor: James Erik Tilman, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/557,206

(22) Filed: Jul. 24, 2012

(65) Prior Publication Data

US 2014/0027570 A1    Jan. 30, 2014

(51) Int. Cl.
| | |
|---|---|
| *G01L 1/22* | (2006.01) |
| *G01L 1/04* | (2006.01) |
| *G01L 1/08* | (2006.01) |
| *G01L 5/28* | (2006.01) |
| *B64C 25/00* | (2006.01) |
| *B64C 25/42* | (2006.01) |
| *B64D 45/00* | (2006.01) |

(52) U.S. Cl.
CPC . *G01L 5/28* (2013.01); *B64C 25/00* (2013.01); *B64C 25/42* (2013.01); *G01L 1/2287* (2013.01); *B64D 2045/008* (2013.01); *G01L 1/2218* (2013.01)
USPC ........................................ 73/862.045; 73/862

(58) Field of Classification Search
USPC .............................................. 73/862.045, 862
See application file for complete search history.

(56) References Cited

U.S. PATENT DOCUMENTS

| | | | |
|---|---|---|---|
| 4,043,607 A | 8/1977 | Signorelli et al. | |
| 4,407,686 A | 10/1983 | Cook et al. | |
| 4,484,282 A * | 11/1984 | Cook et al. | ........................ 701/71 |
| 5,806,794 A | 9/1998 | Hrusch et al. | |
| 6,739,199 B1 | 5/2004 | Nikkel | |
| 7,694,586 B2 | 4/2010 | Rey | |
| 7,938,016 B2 * | 5/2011 | Koschmieder | .................. 73/799 |
| 8,365,609 B2 * | 2/2013 | Shimazu et al. | ................. 73/777 |
| 2002/0105423 A1 * | 8/2002 | Rast | .............................. 340/479 |
| 2011/0088489 A1 | 4/2011 | Yamamoto | |

FOREIGN PATENT DOCUMENTS

| | | |
|---|---|---|
| EP | 0921384 A1 | 6/1999 |
| EP | 1189047 A2 | 3/2002 |

* cited by examiner

*Primary Examiner* — Lisa Caputo
*Assistant Examiner* — Jamel Williams
(74) *Attorney, Agent, or Firm* — Hugh P. Gortler

(57) ABSTRACT

An apparatus comprises a brake rod and a flexible dielectric membrane wrapped around the brake rod. The membrane has a plurality of substrate cutouts at precise locations for strain gage substrates.

16 Claims, 5 Drawing Sheets

WRAPAROUND STRAIN GAGE ASSEMBLY FOR BRAKE ROD

BACKGROUND

A landing gear assembly of a large commercial aircraft may include a plurality of wheel and brake assemblies under the aircraft's nose and wings. Each wheel and brake assembly may include a wheel, rotor discs that rotate with the wheel, and stator discs that are fixed against rotation with respect to a brake head or housing. A brake rod, which may be connected to the brake head and to a landing strut, prevents rotation of the brake head during braking.

During braking, loads on the brake rods are measured. The measured loads are used to determine braking force.

The load on each brake rod may be measured by a strain gage. A strain gage such as a Wheatstone bridge includes multiple elements, which are mounted with precision on each brake rod. After the elements have been mounted, thin gage wires are soldered onto the elements.

Several hours may be spent building a Wheatstone bridge on a single brake rod. In a large commercial aircraft, there might be as many as sixteen brake rods.

It would be desirable to reduce the time to build a Wheatstone bridge on a brake rod.

SUMMARY

According to an embodiment herein, an apparatus comprises a brake rod and a flexible dielectric strip wrapped around the brake rod. The strip has a plurality of substrate cutouts at precise locations for strain gage substrates.

According to another embodiment herein, a strain gage assembly comprises a strain gage including a plurality of substrates, and a flexible dielectric strip having a plurality of substrate cutouts for the substrates. The substrates are mounted in the cutouts.

According to another embodiment herein, a brake rod assembly comprises an aircraft brake rod, and at least one strain gage assembly. Each strain gage assembly includes a flexible dielectric strip wrapped around the brake rod, and a plurality of strain gage substrates mounted within cutouts in the dielectric strip.

According to another embodiment herein, an aircraft landing gear assembly includes a plurality of wheels and brake discs, a plurality of brake rods for the plurality of brakes discs, and a plurality of strain gage assemblies. Each strain gage assembly is wrapped around a corresponding brake rod and includes a flexible dielectric strip having a plurality of substrate cutouts at precise locations for strain gage substrates.

According to another embodiment herein, a method comprises wrapping a strain gage assembly around a brake rod of an aircraft brake assembly. The strain gage assembly includes a flexible dielectric strip having a plurality of alignment marks, and a plurality of substrates attached to the strip at precise locations relative to the marks. The method further comprises aligning the marks on the strip to align ends of the strip and precisely locate the strip on the brake rod.

These features and functions may be achieved independently in various embodiments or may be combined in other embodiments. Further details of the embodiments can be seen with reference to the following description and drawings.

DETAILED DESCRIPTION

Figure 1:
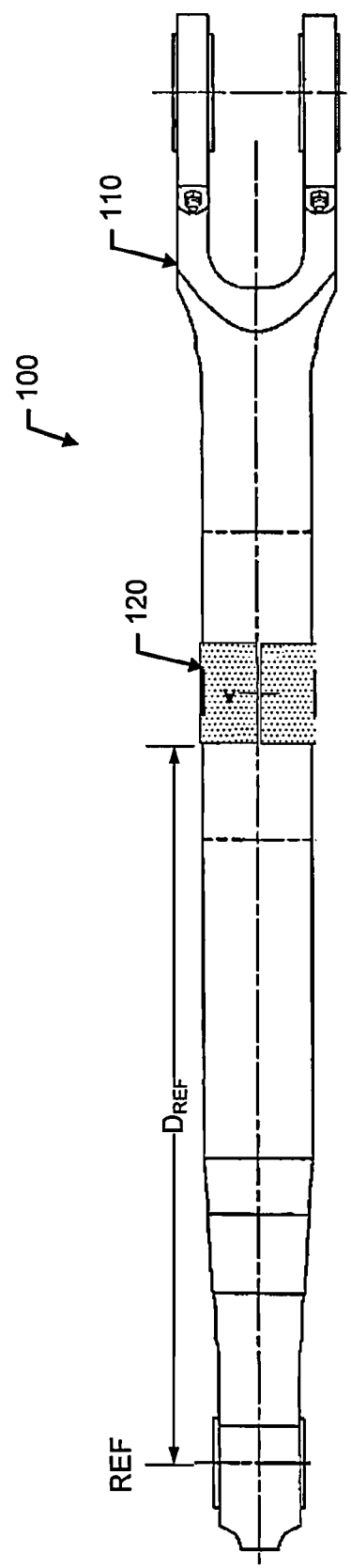
FIG. 1 is an illustration of a brake rod and a strain gage assembly wrapped around the brake rod.

Reference is made to FIG. 1, which illustrates a brake rod assembly 100 including a brake rod 110 and a strain gage assembly 120 wrapped around the brake rod 110. The strain gage assembly 120 measures loads (e.g., axial or transverse or both) on the brake rod 110. The brake rod 110 is not limited to any particular type of vehicle. For instance, the brake rod 110 may be part of an automotive brake system, an aircraft landing gear system, or a railroad locomotive system. The brake rod 110 is not even limited to a vehicle. Other platforms include, but are not limited to, cranes, derricks, winches, and shipping tugs.

Figure 2A:
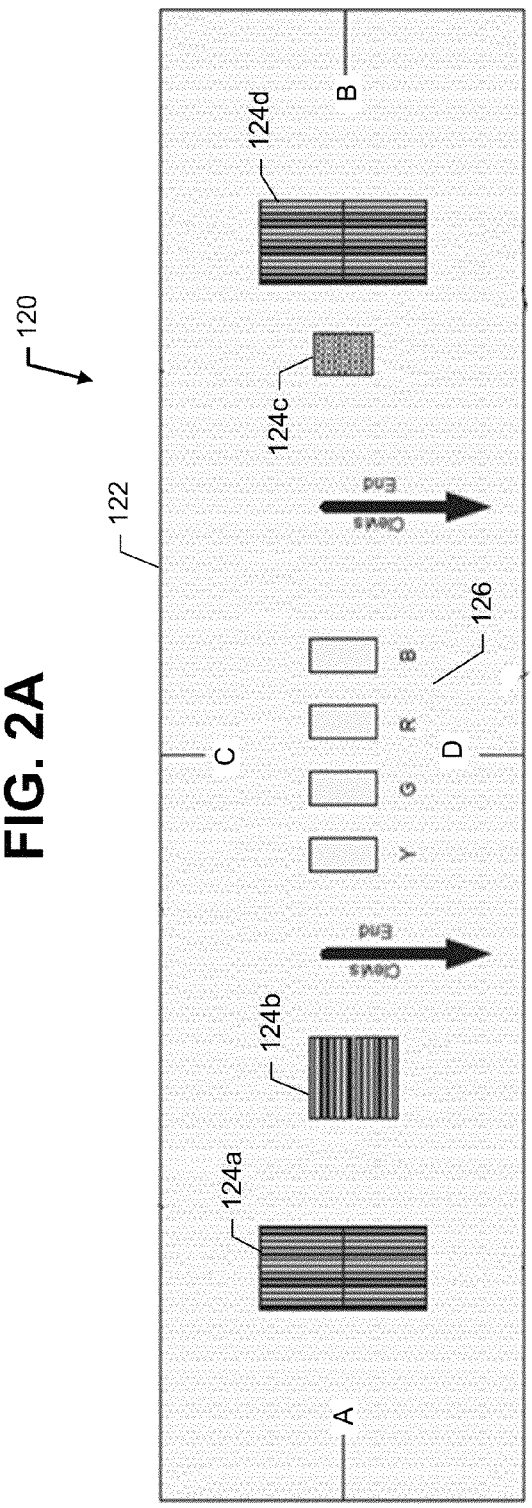
FIG. 2A is an illustration of an example of the strain gage assembly.

Additional reference is made to FIG. 2A, which illustrates an example of the strain gage assembly 120. The strain gage assembly 120 of FIG. 2A includes a flexible dielectric strip 122 having a plurality of substrate cutouts at precise locations for strain gage substrates. Each strain gage substrate includes one or more elements of a strain gage. The strain gage assembly of FIG. 2A includes four substrates 124a, 124b, 124c and 124d at various locations.

Figure 2B:
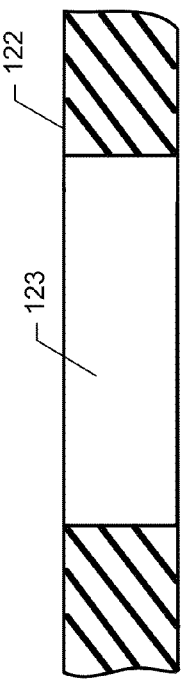
FIG. 2B is an illustration of a substrate cutout for a dielectric strip of the strain gage assembly.

FIG. 2B illustrates a substrate cutout 123 for a dielectric strip 122 of the strain gage assembly 120. The cutout 123 penetrates all the way through the strip 122. Each substrate 124a-124d is located within its corresponding cutout 123 and is attached to the dielectric strip 122. The substrates 124a-124d are positioned at a depth whereby they will rest against the brake rod 110 when the strain gage assembly 120 is wrapped around the brake rod 110.

The strain gage assembly 120 of FIG. 2A further includes a plurality of terminals 126 on the flexible dielectric strip 122. Traces and/or jumper wires (not shown) on the flexible dielectric strip 122 connect the elements on the substrates 124a-124d to the terminals 126 in a specific configuration (e.g., as Wheatstone bridge). The terminals 126 may provide a large footprint for wire attachment. Wires (not shown) soldered or otherwise attached to the terminals 126 may be supply sensor signals to another device (e.g., a controller, volt meter, strip chart recorder, scope).

Dielectric properties of the substrates 124a-124d are designed to isolate the strain gage elements from conductive base material. The substrates 124a-124d provide a high insulation resistance between the strain gage elements and the brake rod 110. At least two of the substrates 124a-124d may have different properties, sizes and/or shapes.

Thickness of the dielectric strip 122 is designed to accommodate both sensitivity of the strain gage elements and durability. Increasing the thickness may improve durability and handling of the strain gage assembly 120, but may reduce sensitivity of the strain gage elements. In some embodiments, the dielectric strip 122 may be thinner in those portions that hold the substrates 124a-124d, and thicker in those portions that carry terminals 126.

Figure 3:
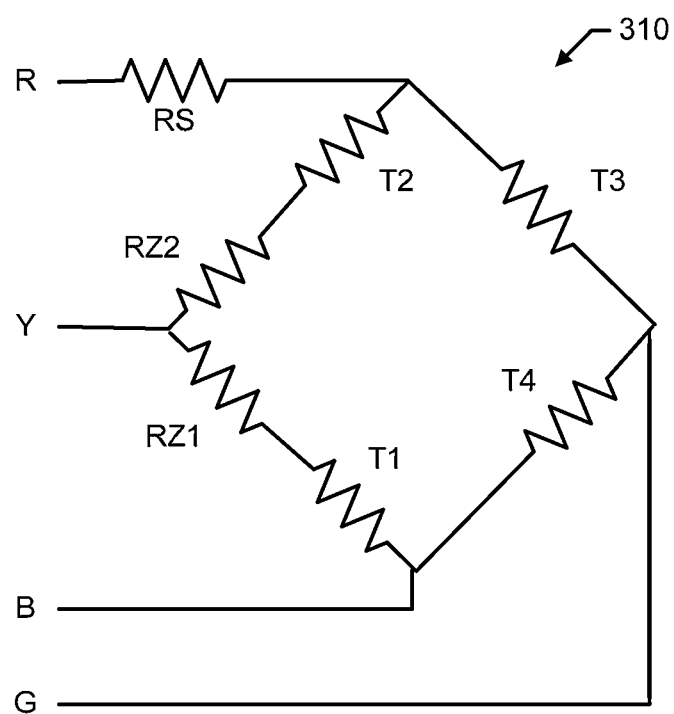
FIG. 3 is a schematic of an example of a strain gage for the strain gage assembly.

FIG. 3 illustrates the strain gage elements on the substrates 124a-124d configured as a Wheatstone bridge 310. The first substrate 124a may include a first Tee rosette T1 and a third Tee rosette T3, the second substrate 124b may include a second Tee rosette T2 and a fourth Tee rosette T4, the third substrate 124c may include a first balance resistor RZ1 and a second balance resistor RZ2, and the fourth substrate 124d may include a span resistor RS. The Tee rosettes T1, T2, T3 and T4 provide two measuring grids arranged on the brake rod at a 90° angle to each other. The Tee rosettes T1, T2, T3 and T4 determine the biaxial stress state with known principle directions. The Tee rosettes T1, T2, T3 and T4 are also used to determine the modulus of elasticity and transverse contraction index (also called the transverse strain index or transverse index).

Referring once again to FIGS. 1 and 2A, the dielectric strip 122 has first and second marks A and B for precisely aligning ends of the strip 122 when wrapped around the brake rod 110 (FIG. 1 shows the first and second marks A and B aligned). The strip 122 has additional marks C and D for precisely positioning the strip 122 along a length and circumference of the brake rod 110.

Figure 4:
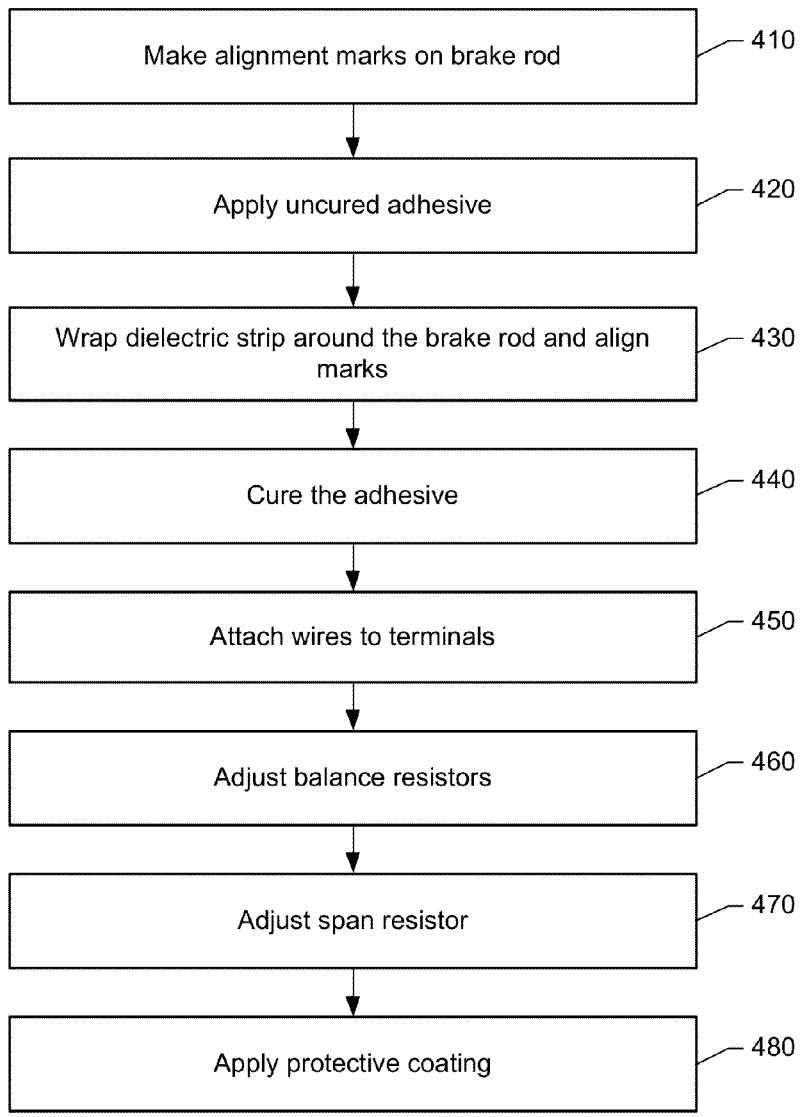
FIG. 4 is an illustration of a method of mounting a strain gage to a brake rod.

FIG. 4 is an illustration of a method of mounting the strain gage assembly 120 to the brake rod 110. At block 410, alignment marks are made on the brake rod 110. Each alignment mark may be a specified distance from a reference a reference point (e.g., a bushing) on the brake rod 110.

At block 420, uncured adhesive is applied to the brake rod 110. An M-bond strain gage adhesive may be used.

At block 430, the dielectric strip 122 is wrapped around the brake rod 110, with the strip ends in opposition, and the marks A and B in alignment (as shown in FIG. 1). The additional marks C and D on the dielectric strip 122 are in alignment with marks on the brake rod 110 to position the dielectric strip with respect to the circumference of the brake rod. An end of the dielectric strip 122 may be measured at a distance $D_{REF}$ from the reference point REF (as shown in FIG. 1) on the brake rod 110 to position the strain gage assembly 120 along the length of the brake rod 110. At this point, the substrates 124a-124d and their strain gage elements are in their precise locations with respect to the brake rod 110. There is a thin layer of adhesive between the substrates and brake rod 110.

At block 440, the adhesive is cured. For example, the strain gage assembly may be wrapped with tape to maintain alignment with the brake rod 110, and then the taped assembly is heated in an oven until the adhesive has been cured.

At block 450, wires are attached to the terminals Y, G, R and B. For instance, the wires may be soldered to the terminals Y, G, R and B.

At block 460, the balance resistors RZ1 and RZ2 may be adjusted so the bridge provides zero output when no strain is present. For example, the balance resistors RZ1 and RZ2 are ladder-type compensating resistors whose resistance is irreversibly increased when sections of metal foil are removed. For the Wheatstone bridge 310 of FIG. 3, a voltage is applied across terminals R and B, and an output voltage is measured across terminals Y and G. Rungs on balance resistor RZ2 are cut if the output voltage is positive, and rungs on balance resistor RZ1 are cut if the output voltage is negative.

At block 470, the span resistor RS is adjusted to calibrate the strain gage to provide a specified output, relative to the zero-balance value, given a specified input strain. Variations (e.g. brake rod wall thickness) may be adjusted out with the span resistor RS. For example, the brake rod 110 is placed in test fixture and a tensile load is applied. The span resistor RS is adjusted (e.g. by cutting rungs) until the output voltage is at the specified value.

At block 480, a protective coating is applied to the strain gage assembly 120. For example, electrical resin is applied over the strain gage assembly 120, and a sealant is applied over the resin.

Figure 5:
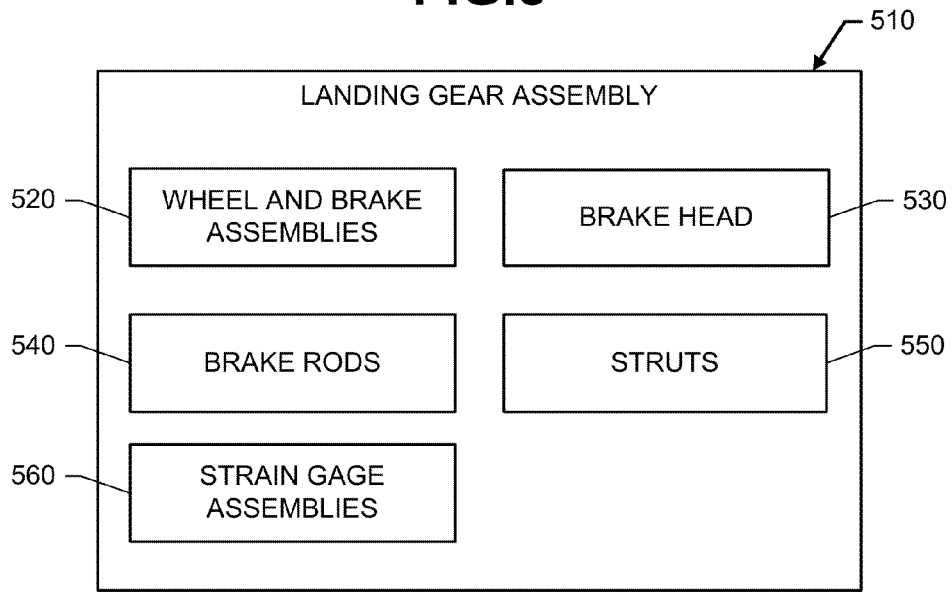
FIG. 5 is an illustration of an aircraft landing gear assembly.

FIG. 5 is an illustration of aircraft landing gear assembly 510 of a large commercial or military aircraft. The landing gear assembly 510 includes a plurality of wheel and brake assemblies 520 and a brake head 530. Each wheel and brake assembly 520 may include a wheel, rotor discs that rotate with the wheel, and stator discs that are fixed against rotation with respect to the brake head 530.

Each landing gear assembly 510 further includes a plurality of brake rods 540 and landing struts 550. Each brake rod 540 is connected to the brake head 530 and to a landing strut 550. The brake rod 540 prevents rotation of the brake head 540 during braking.

Each landing gear assembly 510 further includes a plurality of strain gage assemblies 560 as described herein. At least one strain gage assembly 560 is mounted to each brake rod 540.

Figure 6:
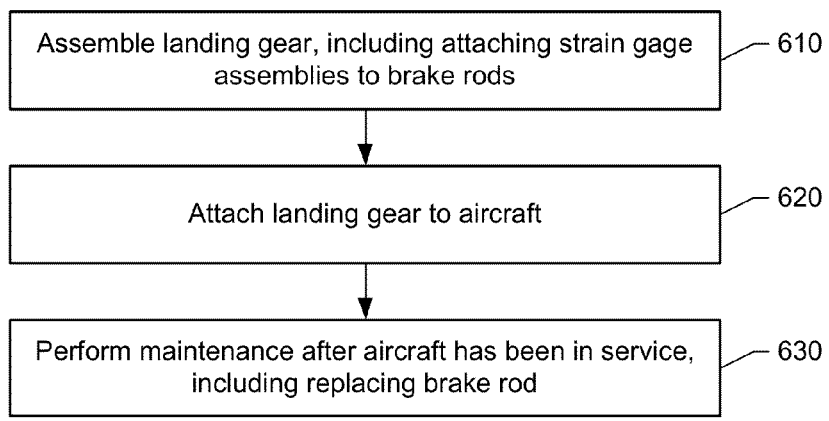
FIG. 6 is an illustration of a method for an aircraft.

FIG. 6 is an illustration of a method for an aircraft. During production of the aircraft, landing gear is assembled (block 610), and a plurality of landing gear assemblies are attached to the aircraft under the aircraft's fuselage and wings (block 620). In some embodiments, each landing gear is assembled by a vendor and shipped to a system integrator, which attaches the landing gear assembly to the aircraft. During assembly of the landing gear, the landing gear vendor may purchase strain gage assemblies described herein from another vendor, and may mount at least one strain gage assembly onto each brake rod.

The landing gear assemblies may be delivered to the system integrator with the strain gages in place. As part of attaching the landing gear assemblies, the system integrator may connect the strain gage assemblies to a brake system control unit. The control unit may include a precision voltage source for supplying an excitation to the strain gage assemblies. The control unit processes signals from the strain gage assemblies to determine braking force during aircraft braking.

After the aircraft has been delivered to a customer (e.g., an airline carrier) and used in service, the strain gage assemblies will be serviced If a maintenance inspection reveals wear on a surface of the brake rod, or tests indicate that strain gage assembly should be replaced, the corresponding brake rod is removed and replaced by airline mechanics (block 630). The removed brake rod may then be sent out for overhaul.

A strain gage assembly herein is significantly faster to install than attaching substrates directly to a brake rod. The combination of marks on the dielectric strip and precise locations of the substrates on the strip allows fewer measurements to be made. Moreover fewer parts are attached at the time of assembly or maintenance. Precise locations of the substrates are handled by the vendor of the strain gage assembly, not the vendor of the landing gear assembly or a third party maintenance service.

A strain gage assembly herein also provides greater uniformity among the wheels, since the strain gage assembly is much less dependent on process and skill of manually mounting individual substrates on a brake rod.

Although a resistive full bridge Wheatstone bridge having four substrates is described above, a strain gage assembly herein is not so limited. A Wheatstone bridge having a different number of substrates may be used. A capacitive or inductive Wheatstone bridge may be used.

A strain gage herein is not even limited to a Wheatstone bridge. Other types of strain gages having different numbers of substrates may be used.

A strain gage assembly herein may be used on a rod other than a brake rod. For instance, a load cell may be made with a strain gage assembly herein.

The invention claimed is:

1. Apparatus comprising:
   a brake rod; and
   a flexible dielectric strip wrapped around the brake rod, the strip having a plurality of substrate cutouts at precise locations for strain gage substrates.

2. The apparatus of claim 1, further comprising strain gage substrates mounted in the substrate cutouts.

3. The apparatus of claim 2, wherein the strain gage substrates include elements of a Wheatstone bridge.

4. The apparatus of claim 3, further comprising a plurality of terminals on the dielectric strip, and wires and traces connecting the terminals to the strain gage elements in the configuration of the Wheatstone bridge.

5. The apparatus of claim 4, wherein a first portion of the dielectric strip holds the substrates and is configured for sensing strain, and a second portion is configured to carry the terminals.

6. The apparatus of claim 2, further comprising a protective coating on the substrates.

7. The apparatus of claim 1, wherein the dielectric strip includes marks for precisely aligning ends of the dielectric strip when wrapped around the brake rod, and marks for precisely positioning the dielectric strip along a length and circumference of the brake rod, the substrates attached to the dielectric strip at precise locations relative to the marks.

8. The apparatus of claim 1, wherein the brake rod is an aircraft brake rod.

9. A strain gage assembly comprising:
   a strain gage including a plurality of substrates; and
   a flexible dielectric strip having a plurality of cutouts for the substrates, the substrates mounted in the cutouts.

10. The assembly of claim 9, wherein the strip includes marks for precisely aligning ends of the dielectric strip when wrapped around the brake rod, and marks for precisely positioning the dielectric strip along a length of the brake rod.

11. The assembly of claim 9, wherein at least two of the substrates have different properties, sizes or shapes.

12. The assembly of claim 9, further comprising a plurality of terminals on the dielectric strip, wherein a portion of the dielectric strip carrying the substrates is thinner than a portion carrying the terminals.

13. A brake rod assembly comprising:
   an aircraft brake rod; and
   at least one strain gage assembly including a flexible dielectric strip wrapped around the brake rod, and a plurality of strain gage substrates mounted within cutouts in the dielectric strip.

14. An aircraft landing gear assembly comprising:
   a plurality of wheels and brake discs;
   a plurality of brake rods for the plurality of brakes discs; and
   a plurality of strain gage assemblies, each strain gage assembly wrapped around a corresponding brake rod and including a flexible dielectric strip having a plurality of substrate cutouts at precise locations for strain gage substrates.

15. A method comprising:
   wrapping a strain gage assembly around a brake rod of an aircraft brake assembly, the strain gage assembly including a flexible dielectric strip having a plurality of alignment marks and a plurality of substrates attached to the strip at precise locations relative to the marks; and
   aligning the marks on the strip to align ends of the strip and precisely locate the strip on the brake rod.

16. The method of claim 15, wherein the strain gage assembly is wrapped around the brake rod and precisely positioned by a landing gear vendor during assembly of the landing gear.

* * * * *